United States Patent [19]

Boyer

[11] 4,293,814
[45] Oct. 6, 1981

[54] CRANKSHAFT POSITION SENSOR CIRCUITRY FOR PROVIDING STABLE CYCLICAL OUTPUT SIGNALS WITHOUT REGARD TO PEAK TO PEAK VARIATIONS IN SENSOR SIGNALS

[75] Inventor: Wesley D. Boyer, Dearborn Heights, Mich.

[73] Assignee: Ford Motor Company, Dearborn, Mich.

[21] Appl. No.: 64,699

[22] Filed: Aug. 8, 1979

[51] Int. Cl.³ ............................ G01P 3/48; G01P 3/54; G01B 7/14

[52] U.S. Cl. ................................. 324/166; 324/173; 324/208; 123/612

[58] Field of Search ............... 324/166, 169, 173, 174, 324/207, 208, 251, 103 P; 307/358, 359; 123/612, 414, 613, 614, 615, 616, 617

[56] References Cited

U.S. PATENT DOCUMENTS

| | | | |
|---|---|---|---|
| 3,622,898 | 5/1970 | Salmon | 324/251 |
| 3,761,725 | 9/1973 | Meyer | 250/555 |
| 3,846,623 | 11/1974 | Wefers et al. | 307/359 |
| 3,875,920 | 4/1975 | Williams | 123/617 |
| 3,923,030 | 12/1975 | Luteren | 123/148 E |
| 4,106,460 | 8/1978 | Kopera | 123/146.5 D |
| 4,163,160 | 7/1979 | Frazee | 307/260 |

FOREIGN PATENT DOCUMENTS 7723531 7/1977 France .

Primary Examiner—Gerard R. Strecker
Assistant Examiner—Walter E. Snow
Attorney, Agent, or Firm—Paul K. Godwin, Jr.; Clifford L. Sadler

[57] ABSTRACT

An amplifier circuit for use with Hall effect and other similar type sensors whereby the circuit is conditioned by the cyclical signal input from the sensor and sets a threshold level based upon the signal input from the sensor, so that the signal output from the circuit is a voltage replica of the input signal, but modified to have a predetermined and constant high and low peak values without regard to peak value variations of the cyclical input signal.

2 Claims, 5 Drawing Figures

CRANKSHAFT POSITION SENSOR CIRCUITRY FOR PROVIDING STABLE CYCLICAL OUTPUT SIGNALS WITHOUT REGARD TO PEAK TO PEAK VARIATIONS IN SENSOR SIGNALS

BACKGROUND OF THE INVENTION

1. Field of the Invention

The present invention is related to ignition systems for internal combustion engines and more specifically to amplifier circuits which are used in conjunction with engine speedcrankshaft position sensors.

2. Description of the Prior Art

Over the past several years there has been a tendency in the automotive field to eliminate conventional mechanical breaker systems which provided timing pulses to ignition systems that, in turn, supplied properly timed spark energy to the individual spark plugs of the engine. One of the more popular replacements for the standard mechanical breaker system is the Hall effect sensor in combination with a rotating ferrous shunting element attached to the distributor shaft or the crank shaft of the engine. The Hall effect sensor is electrically connected to a solid state amplifier to produce a pulsating voltage signal to the primary of an ignition coil.

A typical sensor and circuit are shown in U.S. Pat. No. 3,875,920, whereby a multi-vaned shunt wheel is mounted in a distributor for rotation with the distributor shaft. As the shunt wheel is rotated, the individual ferrous shunting vanes rotate to a close proximity of the Hall effect sensor and a permanent magnet located next to the Hall effect sensor. The close proximity of any vane causes the magnetic field at the sensor to be reduced and thereby affect its electrical output signal. As the vane rotates past the Hall effect sensor, the magnetic field at the sensor increases and causes the electrical output signal from the sensor to increase. Therefore, a cyclical signal is generated by the Hall effect sensor, which is indicative of the speed at which the shunt wheel is rotating and is synchronized with the position. The amplifying circuit, as described in that patent, is used to drive a Schmitt trigger circuit when the output level of the Hall effect sensor rises above a certain predetermined level. Similarly, when the signal from the Hall effect sensor passes below another predetermined level, the output from the Schmitt trigger falls back to a low level.

Typically, the output of the Hall effect sensor is a cyclical signal having high and low peak values which are irregular and vary with respect to each other. In addition, the differential voltage derived from the Hall effect sensor provides an offset for the varying peak cyclical signal and this also may vary from sensor to sensor, depending upon the strength of the magnet, Hall voltage coefficient, and the value of the biasing voltage.

Variations in the peak to peak voltage are commonplace in Hall effect sensors since the vaned shunt wheels, such as shown in U.S. Pat. No. 3,875,920 and discussed above, are not precisely manufactured items and therefore may be either eccentrically mounted on the shaft or the vanes may have slight bends in them which cause variations in spacing between the individual vanes and the Hall effect sensor as the shunt wheel is rotated about the shaft.

SUMMARY OF THE INVENTION

It is an object of the present invention to overcome the problems in the prior art by providing a signal conditioning amplifier with a self-adjusting threshold, for use with Hall effect or similar type sensor, which produces stable cyclical output signals without regard to peak to peak variations in sensor signals, the value of the steady state magnetic field or the offset voltage.

It is another object of the present invention to provide a signal conditioning amplifier for use with a Hall effect type sensor wherein the output signal is a voltage replica of the profile of a rotating shunt wheel having sections spaced at different lengths from the Hall effect sensor as the wheel rotates.

It is a further object of the present invention to provide a signal conditioning amplifier with a self-adjusting threshold whereby the input cyclical signal high and low peak values are respectively sampled and stored to derive a threshold level which is compared against the amplified cyclically varying input signal.

It is still a further object of the present invention to provide an amplifier which automatically adapts the substituted input signal devices to provide a predictable output signal voltage.

The present invention achieves the aforementioned objects by providing a linear differential amplifier circuit which monitors the differential voltage from a biased Hall effect sensor. The sensor monitors the rotation on a ferrous actuating wheel having a high-low profile configuration, which affects a variation in the air gap between the sensor and wheel as the wheel rotates. A negative feedback circuit is associated with the differential input amplifier so as to prevent the amplifier from going into saturation. The negative feedback network contains a series of base-collector connected transistors which provide a voltage divider circuit whereby different levels of the amplified input signal are monitored at three individual points. A minimum peak value detector circuit monitors a first point in the negative feedback circuit and stores a voltage having a value corresponding to the minimum peak values of the cyclically varying input signal. A maximum peak value detector monitors a second point in the negative feedback circuit and stores a voltage having a value corresponding to the maximum peak values of the cyclically varying input signal. A third point in the negative feedback circuit provides the amplified input signal to a comparator amplifier. The minimum peak detector and the maximum peak detector circuits are connected to supply voltage across a threshold level voltage divider network, which is tapped to provide a predetermined fractional level with respect to the difference between the minimum peak voltage value and the maximum peak voltage value output from the respective detectors. The tapped voltage level provides a threshold reference voltage which is fed to one input port of the comparator amplifier and compared with the amplified input signal from the third point on the negative feedback circuit. The output of the comparator is in the form of a square wave signal which varies from zero to a saturated output voltage and back for each cycle of input signal without regard to variations in the peak values of the input signal.

DETAILED DESCRIPTION OF THE PREFERRED EMBODIMENT

Figure 1:
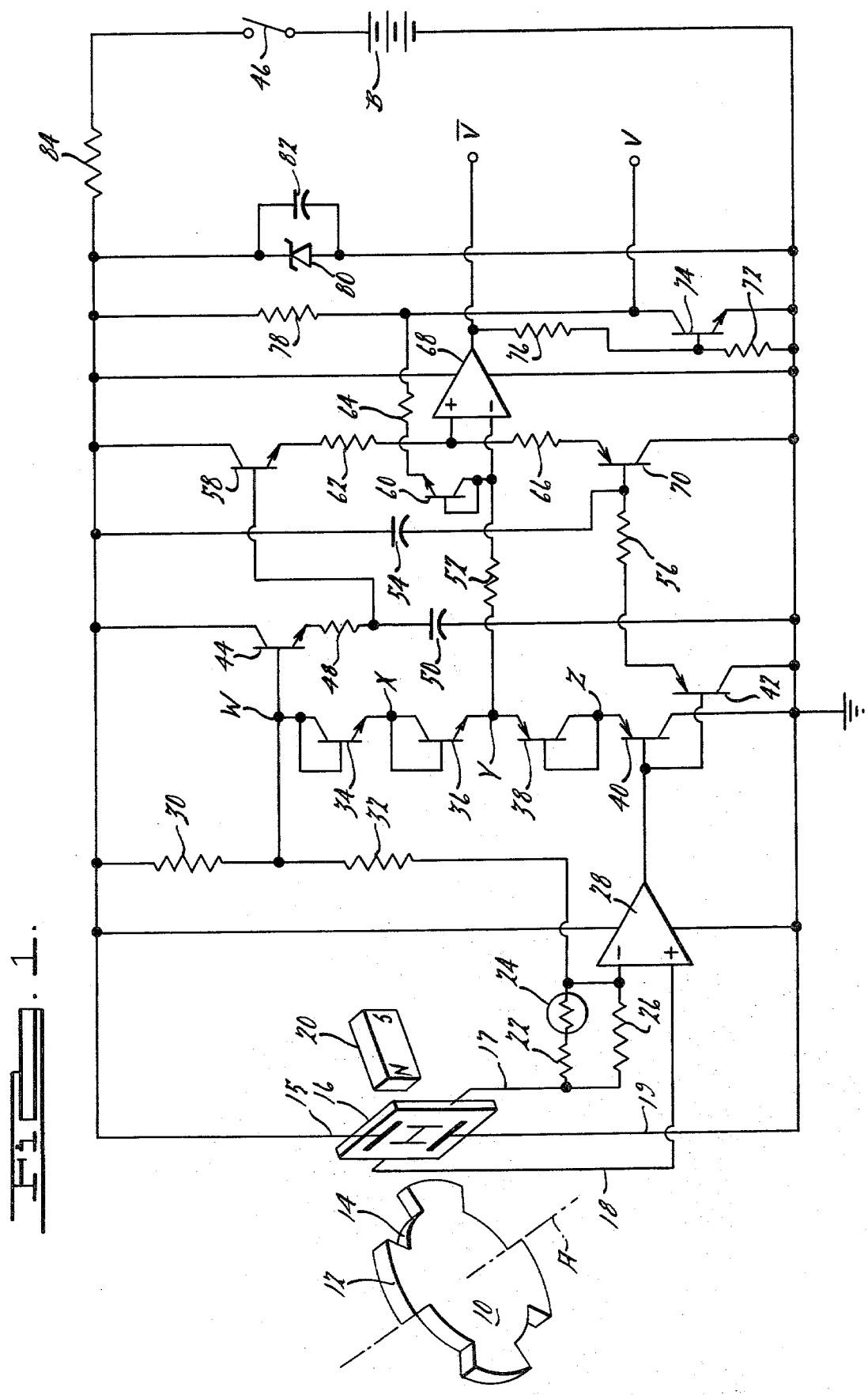
FIG. 1 is a schematic of the preferred embodiment of the invention.

A schematic of a circuit which embodies the present invention is shown in FIG. 1. That circuit receives energization from a D.C. source designated as B, and is controlled for on/off energization by a switch 46. A load resistor 84 in combination with a zener diode 80 and a capacitor 82 provide a regulated 5 volts with high frequency filtering to the circuit.

A conventional Hall effect type sensor cell 16 is connected in a conventional manner so that a DC bias voltage is applied between conductors 15 and 19 of the Hall effect cell 16. A permanent magnet 20 provides the necessary magnetic flux field to the Hall effect sensor cell 16 and any disturbance of that magnetic flux field, such as that due to increase or decrease of flux density at the cell 16, affects the output voltage from the Hall effect cell 16 on output leads 17 and 18.

As used in automotive applications, an actuating wheel, such as that shown and designated as 10, is mounted to rotate at a rate which is proportional to the speed of the engine of the vehicle. The wheel 10 may be mounted on a distributor shaft or at the crank shaft to monitor the vehicle engine speed and shaft position. It rotates about an axis "A" and is formed of a ferrous material. The profile of the actuating wheel 10 defines a plurality of flux linking sections 12 uniformly spaced about the center of the wheel 10 and extending over a predetermined arc. Therefore, as the extended sections 12, approach the Hall effect cell 16, the magnetic flux is concentrated from the magnet through the narrowing air gaps. Between each of the radial extending sections 12 is a segment having a longer air gap 14. Normally, when this type Hall effect cell is used as a crank shaft positioning device in an internal combustion engine, the number of radially extending sections 12 correspond to half the number of cylinders in the engine. In this case, where four radially extending sections 12 are indicated on the actuating wheel 10, it may be assumed that an eight cylinder engine is being controlled by the ignition system.

It is well known that in the Hall effect type sensor, as the air gap between the sensor portion 16 and the actuating wheel 10 is changed, such as by rotation, the output voltage at lines 17 and 18 will correspondingly vary. In this case, the actuating wheel contains 4 radially extending sections 12 separated by four longer air gaps 14 and it is apparent that the signal output of the Hall effect cell 16 is in the form of a square wave having high and low peak values corresponding to the segments producing high and low flux densifies in the Hall cell.

Figure 2:
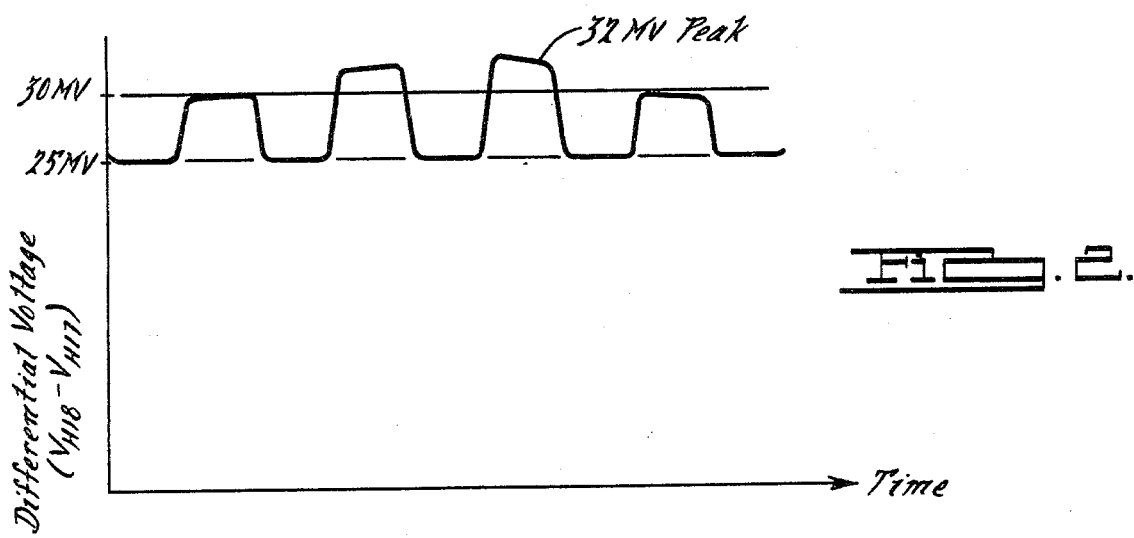
FIG. 2 shows a typical waveform output from a Hall effect type sensor.

FIG. 2 illustrates a waveform which may be typically derived from the output of a Hall effect sensor taken over a particular time period. The differential voltage, which is the voltage at line 17 subtracted from the voltage at line 18 results in a square wave signal which approximately corresponds to the binary profile of the actuating wheel 10. However, it can also be seen that there is an offset voltage whereby the resultant square wave output of the Hall effect cell 16 is offset from zero volts by approximately 25 millivolts. The offset voltage may vary between substituted sensors, since it is a function of the biasing current flowing between lines 15 and 19, the flux density and spacing of the permanent magnet 20 at the Hall cell 16.

FIG. 2 further illustrates that the output signal from the Hall effect cell 16 on lines 17 and 18, while having a square wave configuration, varies in its peak values over the entire profile of the actuating wheel 10. Such variation in the peak values is a common occurrence in Hall effect type sensors, since the actuating wheels such as 10 are not high precision items and therefore may contain some variations in the length of the radially extending sections 12. In addition, although the wheel is mounted to rotate about axis A, it may be mounted so as to have a slight eccentricity due to an inaccurate mounting. Either of the above problems may provide varying air gaps and field shunting that cause corresponding variations in the output signal, as shown in FIG. 2.

Referring again to FIG. 1, the cyclical signal output from the Hall effect cell 16 on lines 17 and 18 is input to a linear differential amplifier 28 at respective negative and positive input ports. A temperature compensation circuit comprises a resistor 22 in series with a thermistor 24 and that series combination is in parallel with a resistor 26. The temperature compensation network is between the line 17 from the Hall effect cell 16 and the negative input port of the linear differential amplifier 28. The temperature compensation circuit forms a temperature variable resistive network that effectively controls the gain of the differential amplifier 28 along with a feedback resistor 32 to compensate for variations in the input signal generated by the Hall effect cell 16 due to temperature changes. The signals have been measured at a 2:1 ratio between 125° C. and −20° C. Therefore, by controlling the gain of the differential amplifier 28 according to temperature, it is possible to compensate for the known systematic input voltage changes caused by temperature and prevent the amplifier from entering into saturation.

Figure 3:
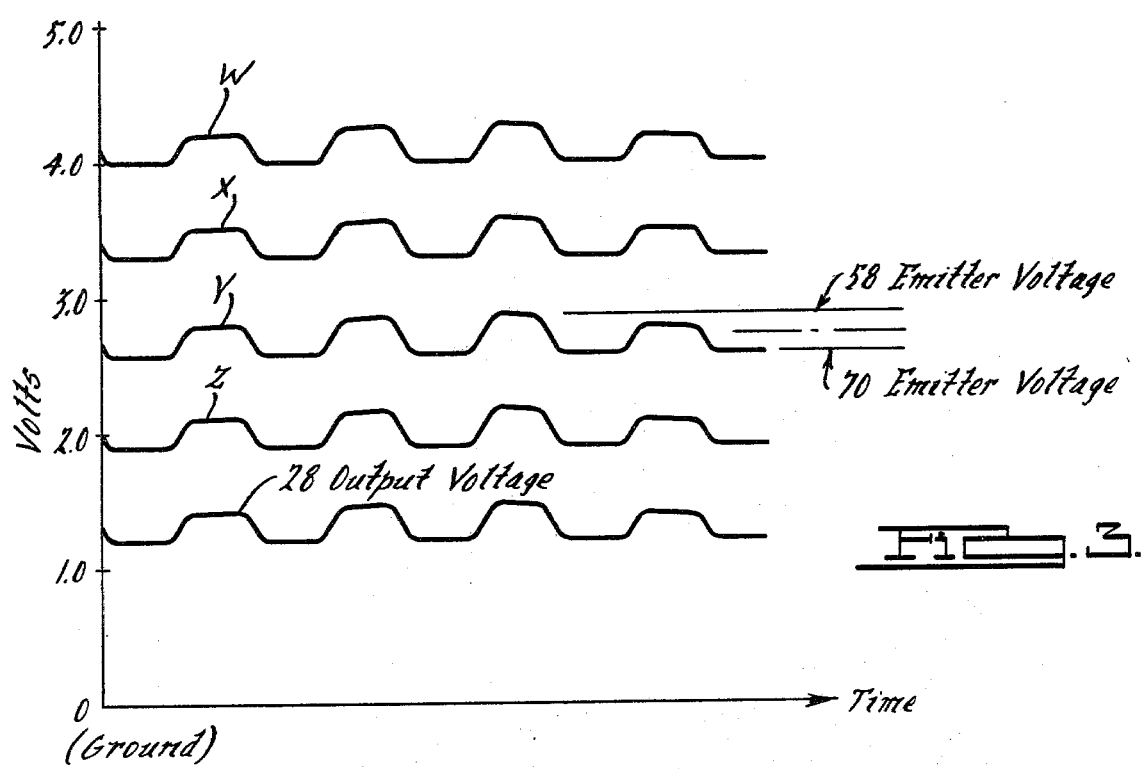
FIG. 3 shows the various waveforms as monitored at designated points in the circuit illustrated in FIG. 1.

The output of the linear differential amplifier 28 is connected to a minimum peak detector circuit comprising a transistor 42 and capacitor 54. The output signal from the linear differential amplifier 28 is shown in FIG. 3 as the lower waveform having an offset voltage of approximately 1.2 volts. With the output voltage signal from the linear amplifier 28 applied to the base of the PNP transistor 42, charging of the capacitor 54 is controlled by the current flowing through the transistor 42 and series, current limiting resistor 56. Within the first quarter revolution of the actuating wheel 10, the capacitor 54 charges rapidly to a value which is representative of the minimum peak values of the cyclical input signal from the Hall effect cell 16. Whenever the input signal exceeds this minimum value the charge on the capacitor 54 is sustained at this essentially constant level, the only discharge path being a very high impedance presented by the back-biased base-emitter junction of transistor 42 in series with resistor 56, and the small base loading of transistor 70.

The output of the linear differential amplifier 28 is also connected to the base of a PNP transistor 40 which has its collector connected to ground and its emitter connected in series with a plurality of diode connected transistors 38, 36 and 34 in the negative feedback loop, with the feedback resistor 32. The base and collector of the PNP transistor 38 are commonly connected to the emitter of transistor 40. The emitter of NPN transistor 36 is connected to the emitter of transistor 38 at a point designated as "Y" and the emitter of NPN transistor 34 is connected to the common base-collector connection of transistor 36. The base-collector connection of transistor 34 is connected to the junction between resistor 30 and the feedback resistor 32 at a point designated as "W". The other side of the resistor 30 is connected to the regulated 5 volts supply. The feedback resistor 32 functions in combination with the temperature compensation circuit described above to set the gain of the linear differential amplifier 28 and to keep the amplifier from going into saturation at either the high or low end of its operating curve.

The effect of the diode connected transistors 38, 36 and 34 in the feedback of the linear differential amplifier 28 is to provide a plurality of incremental (base-emitter) voltage drops of approximately 0.7 volts each to the feedback signal. This is due to the bias current through resistor 30, the diode connected transistors 34, 36, 38 and transistor 40 to ground. When the linear amplifier 28 causes transistor 40 to draw base current, that base current is amplified. The base-emitter voltage at transistor 40 is approximately 0.7 volts. Therefore, for a signal input such as that shown in FIG. 2, the relationship of signals at the designated points of the feedback network are shown in FIG. 3 separated by the incremental 0.7 volts.

At a point designated as "W", an NPN transistor 44 has its base connected to receive the feedback signal of that point. The collector of the transistor 44 is connected to the supply voltage and its emitter is connected to a charging capacitor 50 by way of current limiting resistor 48. The function of the transistor 40 in combination with the capacitor 50 is to detect the maximum peak values of the amplified cyclical input signal from the Hall effect cell 16. Therefore, during the first quarter revolution of the actuating wheel 10, the capacitor 50 rapidly charges through transistor 44 and series resistor 48, to a value which is representative of the maximum peak value of the waveform at "X". The transistor 44 turns on whenever the voltage level at "W" sufficiently exceeds the emitter voltage to cause transconductance and charge the capacitor 50. However, due to the base-emitter voltage drop (approximately 0.7 volts) across the transistor 44, the peak voltage value stored in capacitor 50 matches that shown in waveform "X". Therefore, the 0.7 voltage drop across the diode connected transistor 34 in the feedback network compensates for the 0.7 base-emitter voltage drop across the transistor 44. The voltage charge on capacitor 50 is sustained at the essentially constant maximum level when the input signal is less than the maximum peak because the discharge paths back through resistor 48 and the emitter of transistor 44 and forward into the base of transistor 58 present a very high impedance and long discharge time constant.

Similarly, the minimum peak detection circuit comprising transistor 42 and capacitor 54, discussed above, results in the capacitor 54 storing a voltage value corresponding to the minimum peak values, as shown in waveform designated as "Z". In this instance, the 0.7 base-emitter voltage drop across transistor 40 compensates for the base-emitter voltage drop across transistor 42.

The emitter of transistor 70 is connected to the emitter of transistor 58 through a resistive voltage divider network comprising resistors 66 and 62. The values of the resistors 66 and 62 are selected so as to define a fractional threshold level between the maximum peak voltage level, as sensed by the maximum peak detection circuit, and the minimum peak value, as sensed by the minimum peak detection circuit. In the present embodiment, resistors 66 and 62 are selected to be equal in value so as to select the midpoint between the maximum and minimum peak values and is indicated as the mid-level line in the "Y" waveform shown in FIG. 3.

The voltage at the emitter of transmitter 58 is the value of that stored in capacitor 50, less its base-emitter voltage drop of approximately 0.7 volts. In this case, the incremental voltage drop across diode connected transistor 36 is employed to compensate for the incremental base-emitter voltage drop across NPN transistor 58 and therefore the voltage at the emitter of transistor 58 is equal to the highest peak present in the "Y" waveform shown in FIG. 3.

Similarly, the voltage at the emitter of transistor 70 is the value of that stored in capacitor 54 less the approximately 0.7 volts incremental base-emitter voltage drop across transistor 70. The diode connected transistor 38 is employed to incrementally compensate for the emitter-base voltage drop across PNP transistor 70 and the emitter voltage at the transistor 70 is the minimum peak detected voltage compensated to have a value equal to the lowest peak present in the "Y" waveform.

Figure 4:
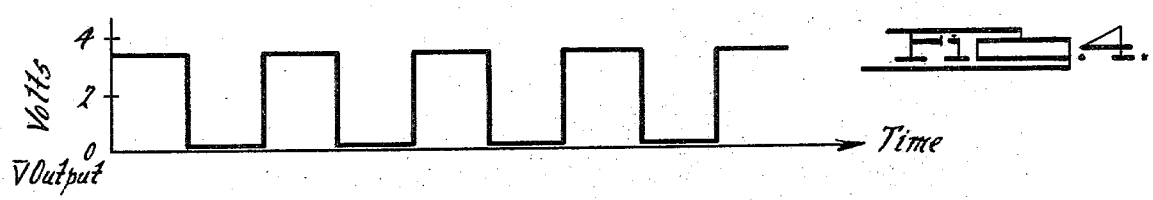
FIG. 4 illustrates the V output signal from the circuit shown in FIG. 1.
Figure 5:
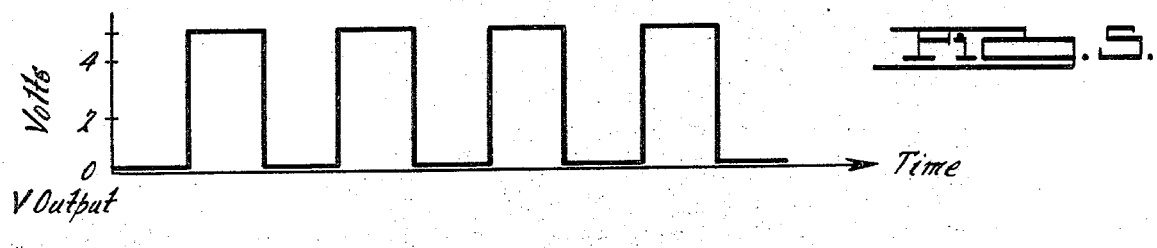
FIG. 5 illustrates the V output signal from the circuit shown in FIG. 1.

The essentially constant threshold level at the junction between resistor 66 and 62 is fed to the positive input port of a comparator 68. The "Y" waveform derived from the junction of the emitters of transistors 38 and 36 is fed through a resistor 52 to the negative input port of the comparator 68 where it is compared with the threshold level. Therefore, whenever the amplified cylical input signal "Y" from the linear amplifier 28 increases to the threshold level, which is at a value midway between the maximum peak detected value and the minimum peak detected value, the comparator circuit 68 inversely provides an output signal "$\overline{V}$", shown in FIG. 4, wherein the output signal changes from a high level state to a low level state. An inverter circuit includes a transistor 74 that has a base connected to a junction between series resistors 76 and 72, which are connected between the output of comparator 68 and ground. Inverter transistor 74 provides an output signal at its collector designated as "V" and is shown in FIG. 5 as having its polarity correspond to that of the amplified cyclical input signal. However, in comparison to the cyclical input signal, it can be seen that both the "$\overline{V}$" and V waveforms have constant amplitude throughout without regard to the extreme peak variations which may occur at the input signal.

Although the embodiment described above with respect to FIG. 1 is adequate to provide the improvements noted with respect to the prior art, it has been found that in some cases it may be desirable to provide a small amount of hysteresis in the switching points of the signal about the threshold level at the comparator 68. Such hysteresis is introduced by positive feedback from the output of the comparator 68 to the negative input port thereof. A resistor 64 is connected between the collector of transistor 74 and the emitter of a diode connected NPN transistor 60. The base-collector connection of the transistor 50 is connected to the negative input port of the comparator 68. The effect of the hysteresis circuit is to depress the signal at the negative input port of comparator 68 by about 20 millivolts and requiring the "Y" signal to rise that much higher than the threshold level before the output of the comparator 68 switches states. Since the minimum signal anticipated at "Y" is at least 20 millivolts, the hysteresis corresponds to a maximum of only 10% of that signal. The effects of the hysteresis introduction has been found to provide greater stability at stall and sub-cranking speeds and provide a greater immunity to noise.

It will be apparent that many modifications and variations may be effected without department from the scope of the novel concept of this invention. Therefore, it is intended by the appended claims to cover all such modifications and variations which fall within the true spirit and scope of the invention.

I claim:

1. In an ignition system for an internal combustion engine, utilizing an electromagnetic sensor to monitor the crankshaft position in said engine, an improved circuit connected to said sensor for receiving a cyclical signal therefrom and generating a corresponding output signal that is a synchronized replica of said cyclical signal having constant high and low peak values wherein said circuit includes:

a first differential amplifier having opposite polarity input ports connected to said electromagnetic sensor to amplify said input cyclical signal;

a negative feedback circuit which includes a plurality of diode connected transistors connected in series between the output of said first differential amplifier and one of its input ports to provide said amplified input cyclical signal at a plurality of junctions at incrementally separated D.C. voltage levels;

a first peak detection circuit connected to one of said diode connected transistors for sampling the high peak values of said amplified input cyclical signal output from said first differential amplifier to derive a high peak voltage level;

a second peak detection circuit connected to the output of said first differential amplifier for sampling the low peak values of said amplified input cyclical signal to derive a low peak voltage level;

a voltage divider circuit connected between said first peak detection circuit and said second peak detection circuit to supply a threshold voltage level at a preselected fractional value between said high and low peak voltage levels;

a comparator circuit having a first input port of one polarity connected to said voltage divider circuit to receive said threshold voltage level and a second input port of an opposite polarity connected to a junction between two of said diode connected transistors in said negative feedback circuit to receive said amplified input cyclical signal at a D.C. level intermediate that of said signal supplied to said first peak detection circuit and that of said signal output from said first differential amplifier, whereby the output of said comparator circuit switches between two distinct voltage levels whenever the amplified input cyclical signal crosses the threshold voltage level and is a voltage replica of said cyclical input signal having constant peak values.

2. A circuit as in claim 1, when said electromagnetic sensor is a Hall effect sensor and said input cyclical signal is derived from an actuator wheel approximate said sensor and rotationally driven by said crankshaft of said engine at a rate proportional to said engine speed.

* * * * *